United States Patent
Tassakos

(10) Patent No.: US 8,078,312 B2
(45) Date of Patent: Dec. 13, 2011

(54) METHODS FOR INSERTING A PART INTO A STORAGE SECTION OF A STORAGE CONTAINER AND INSERTION TOOL ARRANGEMENT

(75) Inventor: Charalambos Tassakos, Stuttgart (DE)

(73) Assignee: Inos Automationssoftware GmbH (DE)

( * ) Notice: Subject to any disclaimer, the term of this patent is extended or adjusted under 35 U.S.C. 154(b) by 567 days.

(21) Appl. No.: 12/261,769

(22) Filed: Oct. 30, 2008

(65) Prior Publication Data
US 2010/0076592 A1 Mar. 25, 2010

(30) Foreign Application Priority Data
Sep. 23, 2008 (EP) .................................... 08016689

(51) Int. Cl.
B65H 1/00 (2006.01)
G06F 7/00 (2006.01)

(52) U.S. Cl. ........ 700/218; 700/215; 700/216; 700/229; 414/806

(58) Field of Classification Search .................. None
See application file for complete search history.

(56) References Cited

U.S. PATENT DOCUMENTS
4,685,095 A 8/1987 Rudy et al.
5,790,338 A 8/1998 Kanai et al.
6,005,734 A 12/1999 Shimada et al.
6,672,574 B2 1/2004 Hamada et al.
2010/0121480 A1* 5/2010 Stelzer et al. ................. 700/215
2011/0060449 A1* 3/2011 Wurman et al. .............. 700/218

FOREIGN PATENT DOCUMENTS
EP 1504857 A 2/2005
FR 2643732 A 8/1990
JP 07254197 A 10/1995

* cited by examiner

Primary Examiner — Gene Crawford
Assistant Examiner — Yolanda Cumbess
(74) Attorney, Agent, or Firm — Donald R. Boys; Central Coast Patent Agency, Inc

(57) ABSTRACT

The invention refers to a Method (69) for automatically inserting at least one part (13) into a storage section (15) of a container (11), wherein the storage section (15) comprises a plurality of holder means (17a-d), wherein the part (13) is inserted (103) by means of an insertion tool (49), and wherein the method (69) comprises the step of detecting (93) the position of the holder means (17a-d) by means of at least one optical sensor (51a-d). In order to provide a method for automatically inserting a part into a storage section (15), wherein collisions are avoided it is suggested that the method (69) further comprises the steps of verifying (95) whether the holder means (17a-d) of a certain storage section (15) are available for insertion of the part (13); detecting (99) the orientation of the holder means (17a-d); determining (100) an insertion path (47) along which the part is inserted; and inserting (103) the part (13) into the available storage section (15) along the determined insertion path (47).

16 Claims, 5 Drawing Sheets

METHODS FOR INSERTING A PART INTO A STORAGE SECTION OF A STORAGE CONTAINER AND INSERTION TOOL ARRANGEMENT

CROSS-REFERENCE TO RELATED DOCUMENTS

The present application claims priority to EPO patent application serial number EP08016689.5, which was filed on Sep. 23, 2007, which is incorporated herein in its entirety, at least by reference.

The present invention refers to a method for automatically inserting at least one part of a given shape into a storage section of a storage container, wherein the storage section comprises a plurality of holder means adapted for holding one of the at least one part, wherein the part is inserted by means of an insertion tool, and wherein the method comprises the step of detecting the position of the holder means by means of at least one optical sensor.

In order to store and transport high-value goods such as expensive parts of a motor vehicle usually special containers are applied which comprises multiple storage sections each of them adapted to hold a single high-value part. Storage of the parts in individual storage sections serves to prevent the parts from being damaged or deformed during storage or transport within the container.

When applying flow production in order to produce the part then the part has to be removed rather quickly from the end of an assembly line in order to avoid a bottleneck slowing down the production process. To this end, it is known in the art to apply industrial robots to automatically remove the part from the end of the assembly line and to insert the part in the container. Known methods use optical sensors to locate a special optical mark placed at a known position within the container and calculate based on the location of the mark the position of the individual storage sections.

The published patent application US 2004/0179206 A1 discloses an optical sensor in the form of a portable device for measuring the position shape, and/or size of an object.

However, when using the known methods disruptions of the production process occur relatively frequently. For instance, if a container which is not completely empty is placed at the end of the assembly line to be automatically filled then it will eventually come to a collision between a part picked up from the end of the assembly line by the robot and a part that was already residing within the container before the container has been placed at the end of the assembly line. Furthermore, the containers are generally used multiple times so that the storage sections are subjected to wear and tear and will become deformed in the course of time. If the robot tries to insert a part into a deformed storage section then the part will collide with it. Both kinds of collisions—collisions of parts with each others and collisions of a part with a deformed storage section—result in a disruption of the production process in most cases. Moreover, the parts involved in the collision may be damaged.

Each time a disruption occurs a work-intensive and time-consuming and therefore expensive manual intervention is needed in order to resume the production process. Therefore, it is desirable to apply a method for inserting the paths in the container that leads to a lower rate of disruptions.

The object of the present invention is to provide a method for automatically inserting a part into a storage section of a container, wherein collisions of parts with each other and collisions of a part with a storage section are avoided.

According to the present invention, this object is achieved by a method of the above-mentioned kind that is characterized in that the method further comprises the steps of
verifying by means of the at least one optical sensor whether the holder means of a certain storage section are available for insertion of the part;
detection the orientation of the holder means of an available storage section by means of the at least one optical sensor;
determining an insertion path along which a part is inserted into the available storage section by means of the insertion tool, the insertion path depending on the shape of the part, the detected position and the orientation of the holder means; and
inserting the part into the available storage section along the determined insertion path.

The step of verifying ensures that those storage sections are selected that are appropriate to insert the part. Thus, storage sections into which the inserting of the part would result in a collision are skipped by the method according to the present invention. Because the insertion path is determined depending on the position and the orientation of the holder means the movement performed by the insertion tool during the inserting is adapted to variances of the shape of the holder means resulting from the deformation of the holder means or other parts of the container after multiple uses of the container. Hence, the method according to the invention avoids collisions by skipping inappropriate storage sections and by adapting the insertion path to the actual shape of the holder means.

According to a preferred embodiment of the present invention the holder means comprise at least one bearing surface adapted to face the inserted part and the method comprises scanning at least one region of at least one bearing surface by means of the at least one optical sensor, wherein said detecting of the position, said verifying and/or said detecting the orientation is based on said scanning. By scanning the bearing surface directly instead of locating a mark placed on the container both the position and the orientation of the holder means can be detected particularly reliably and with a high accuracy. This leads to a highly reliable method which is robust against unexpected variations of the shape of the holder means.

It is preferred that verifying whether the holder means are available comprises checking whether the storage section is occupied by an already inserted part, whether the storage section is blocked by a foreign body, and/or whether the holder means are damaged. The holder means could be damaged by deformation of at least a part of the holder means to, such a large extent that it would not be possible to insert the part into the corresponding storage section anymore. In addition, the holder means are damaged if a part of the holder means is broken away so that the holder means are not able to hold the part within the storage section anymore. When performing said checking, the probability that an occupied, blocked or damaged storage section is selected to insert the part or the probability that a good storage section is erroneously skipped is comparatively low.

In order to provide a method with a rather low computational complexity that still works reliably it is suggested that the scanning comprises computing at least one characteristic point, wherein the characteristic point characterizes a shape of the scanned region of the bearing surface. Preferably, multiple characteristic points are calculated and the position, the orientation and/or the shape of the holder means is detected depending on an absolute position of the points and the relative arrangement of the points to each other. The storage section of the container has usually multiple holder means located at different positions within the storage section. Typically, each holder means has at least one bearing surface adapted to face the inserted part.

In order to allow for scanning the bearing surfaces of the different holder means simultaneously it is suggested that the insertion tool comprises multiple optical sensors and that multiple regions of different bearing surfaces are scanned, wherein the regions of different bearing surfaces are scanned by different sensors.

In order to acquire more precise information about the structure of the bearing surface and therefore the position and the orientation of the corresponding holder means it is preferred that multiple regions of a single bearing surface are scanned by a single sensor.

According to a preferred embodiment of the present invention at least one sensor is a portable sensor. It is preferred that at least one sensor is arranged stationary with respect to the insertion tool and that the scanning comprises moving the insertion tool to at least one scanning position such that the sensor is located next to the region of the bearing surface to be scanned. In other words, at least one sensor is attached to the insertion tool close to the bearing surface or to the region of the bearing surface to be scanned by the sensor. This allows for optimally positioning the sensor to the region to be scanned without the need for a separate actuator for moving the sensor. It is suggested to use a common actuator for both the insertion tool and the sensor mounted on the insertion tool.

It is preferred that the scanning comprises moving the insertion tool successively to multiple difference scanning positions. In each scanning position a different set of regions of the bearing surfaces can be scanned. Thus, a large amount of information corresponding to the position and the orientation of holder means can be acquired. As a consequence, the position as well as the orientation of the holder means can be determined quite precisely.

Furthermore, it is suggested that the container comprises multiple store sections arranged side by side and that the inserting of the part and the scanning are performed simultaneously, wherein the storage section into which a part is inserted and the storage section the region of the bearing surface of which is scanned differ from each other and are, preferably, directly adjacent. By inserting the part into a storage section and simultaneously determining the position and orientation of a different storage section the time needed to fill the container with multiple parts is considerably reduced because determining the position and the orientation of the holder means does not require an additional time interval. Therefore, the method can be executed rather quickly.

According to an embodiment of the present invention it is suggested that the method comprises the step of determining a location—or at least an approximate location—of the container by locating a predetermined portion the container, preferably an outer corner of the container. In order to determine the location of the container the sensor that is used to determine the position and the orientation of the holder means can be applied. However, it is also possible to apply a different sensor dedicated to determine the location of the container. Preferably, the location of the container is determined before the position and the orientation of the holder means of a certain storage section is determined. This allows to initially determine at least an approximate position of a first storage section into which a first part shall be inserted. In this way the method according to the invention can be started quickly and reliably.

The object of the present invention is also solved by an insertion tool arrangement for automatically inserting at least one part of a given shape into a storage section of a storage container wherein the storage section comprises a plurality of holder means adapted for holding one of the at least one part, the insertion tool arrangement comprises an insertion tool for inserting the part and wherein the insertion tool arrangement, preferably the insertion tool, comprises at least one optical sensor for detecting the position of the holder means that is characterized in that the insertion tool arrangement comprises control means configured to automatically operate the insertion tool according to the method according to the present invention. The insertion tool according to the present invention has all advantages of the above described method according to the invention.

It is suggested that the insertion tool arrangement comprises at least one optical sensor to scan the region of the bearing surface, wherein the sensor comprises a laser to light the region and a camera for acquisition of an image of the region. It is preferred to arrange the sensor directly on the insertion tool. To this end, a compact, robust and portable sensor can be applied. Such a sensor is described in the patent application US 2004/01792601 A1, the entire disclosure of which is hereby incorporated by reference. For determining the position and orientation of the holder means this kind of sensor suitable methods of image processing can be applied. For instance, laser triangulation, photogrammetric methods, or methods with structured light can be applied. When using a sensor with multiple cameras then stereo image processing can be used too.

In a preferred embodiment of the present invention the part is essentially flat and the storage section corresponds to an essentially flat portion of the container bounded by at least one slot of the holder means located at an edge of the storage section and forming the bearing surface, and the insertion tool is moveable to at least one scanning position such that the optical sensor is located next to the slot in order to scan at least one region of the bearing surface formed by a slot. In this manner an insertion tool is provided which allows inserting flat parts of a car body such as a hood into the container. However, the insertion tool according to the invention can also be applied to insert different kinds of parts into the container.

In order to allow for determining the position and the orientation of a storage a section and simultaneously inserting the part into a different storage section it is suggested that the holder means comprise multiple slots and the insertion tool comprises multiple sensors, where in each sensor is arrange stationary with aspect to the insertion tool such that each sensor is located next to a different slot if the insertion tool is located at the scanning position.

Preferred embodiments and further advantages of the present invention are shown in the figures and described in detail hereinafter.

Figure 1:
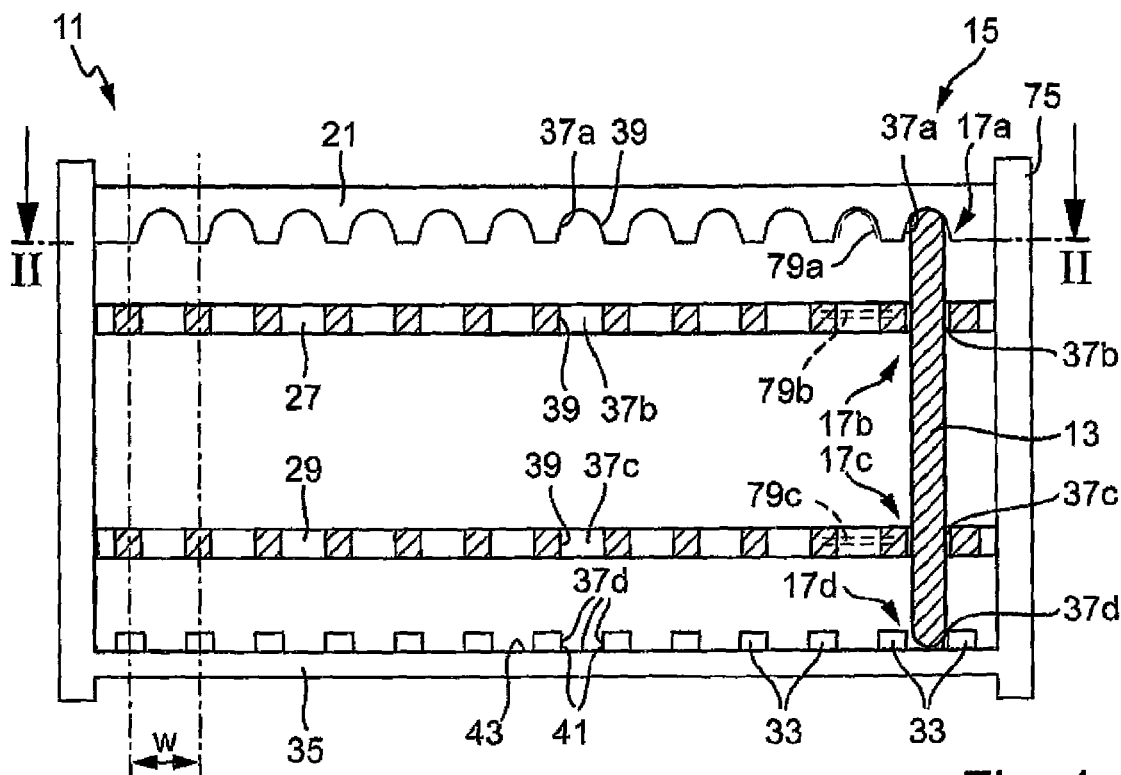
FIG. 1 shows a sectional front few of a container according to a preferred embodiment of the present invention with a part inserted into a storage section of the container.
Figure 2:
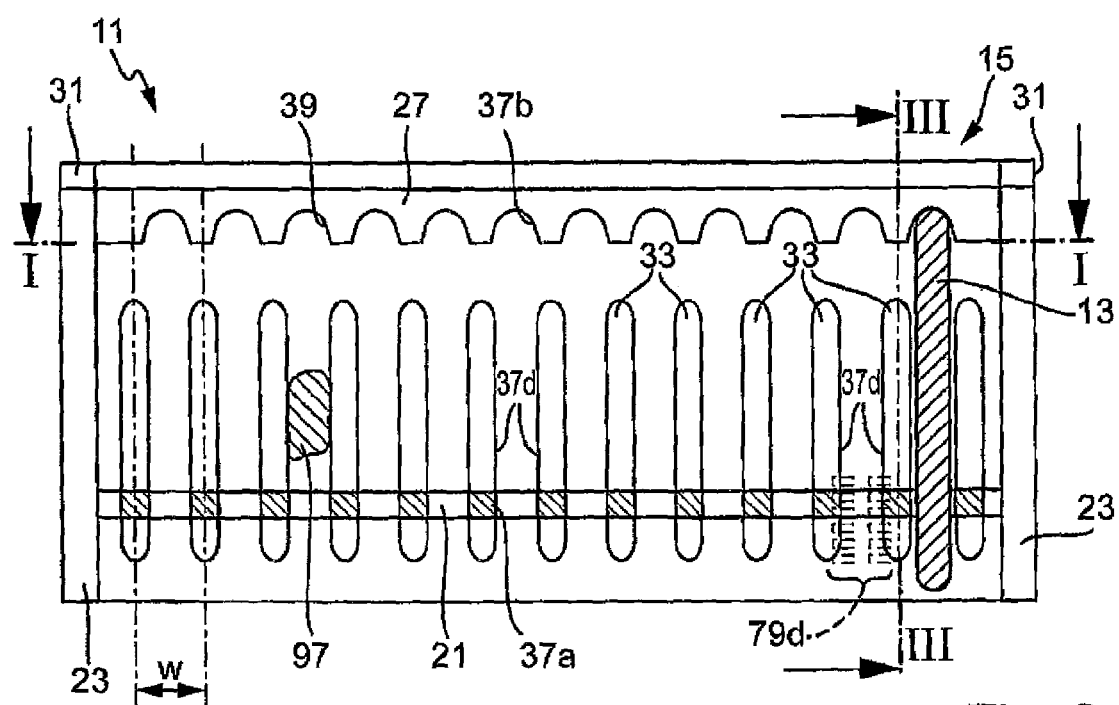
FIG. 2 shows a sectional top few of the container shown in FIG. 1.
Figure 3:
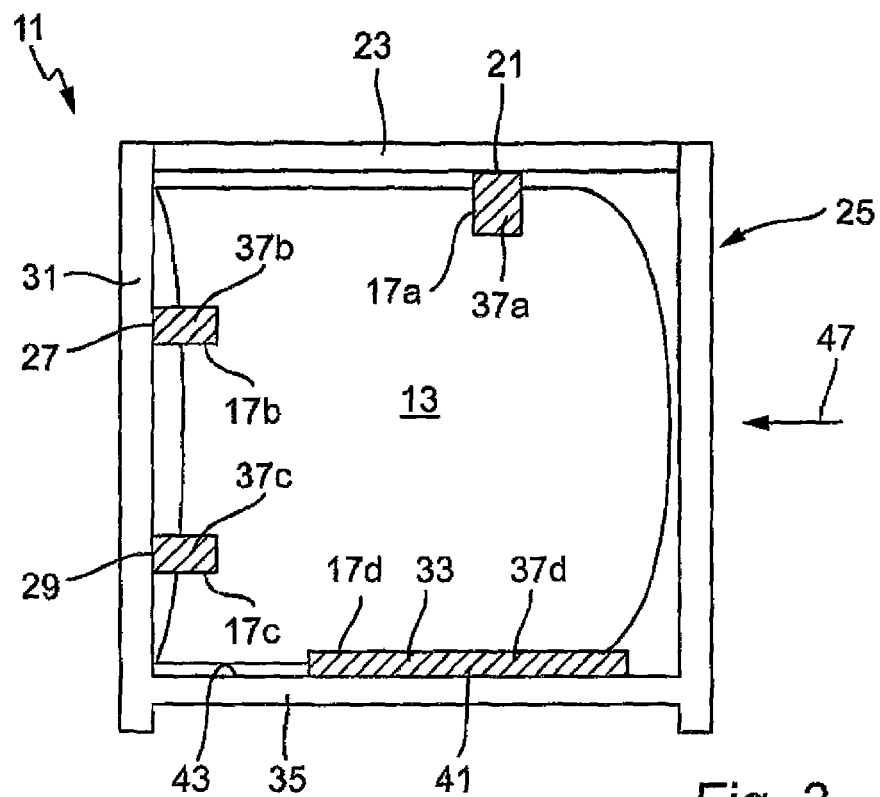
FIG. 3 shows a sectional side view of the storage section of the container shown in FIG. 1 and FIG. 2 and the part inserted in the storage section.

The FIGS. 1 to 3 show a container 11 for storage and transport of multiple parts 13 of a given shape. According to the preferred embodiment described herein the part 13 is a hood for a motor vehicle. However, the present invention can also be applied in connection with different kinds of parts such as arbitrary parts of a motor vehicle, in particular a part of a car body, and the like. The present invention is not limited to applications of the automotive industry. The present invention is particularly well suited to be applied in connection with high value and easily damageable parts which can not be treated as bulk goods and must be handled individually.

The container 11 comprises multiple storage sections 15 each adapted to hold a single part 13 by means of holder means. As shown in FIG. 1, each storage section 15 has a first holder means 17a located at the top of the storage section 15, second holder means 17b located next to first holder means 17a, third holder means 17c located below the second holder means 17b, and forth holder means located below the third holder means 17c.

The first holder means 17a of the storage sections 15 are formed in a first rail 21 located at the top of the container 11 and fixed to top lateral rods 23 of a frame 25 of the container 11 (cf. FIG. 2).

The second holder means 17b of all storage sections 15 are formed into a second rail 27 and the third holder means 17c are formed into a third rail 29. Both the second rail 27 as well as the third rail 29 and are mounted at rear vertical rods 31 of the frame 25 of the container 11. The first rail 21, the second rail 27, and the third rail 29 are parallel each other.

The forth holder means 17d are formed by forth rails 33 which are arranged in parallel to each other and orthogonal to the first rail 21, the second rail 27, and the third rail 29. As shown in FIG. 1 and FIG. 3 the forth rails 33 are mounted on top of a base plate 35 of the container 11.

The first holder means 17a, the second holder means 17b, the third holder means 17c and the forth holder means 17d comprise a first bearing surface 37a, a second bearing surface 37b, a third bearing surface 37c and a forth bearing surface 37d respectively. Each bearing surface 37ad faces the part 13 inserted into the storage section 15. The first bearing surface 37a, the second bearing surface 37b, and the third bearing surface 37c are formed by curved cavities 39 of the corresponding rails 21, 27, 29. The forth bearing surface 37d is bounded by side surfaces 41 of two adjacent forth rails 33 and by a portion of an upper side 43 of the base plate 35 located between these two adjacent forth rails 33.

The bearing surfaces 37a-d form slots into which the part 13 can be inserted. If the part 13 is inserted into these slots then the bearing surfaces 37 engage with certain portions of an outer border the part 13. In this manner an undesired movement of the part 13 within the container 11 during storage or transport is avoided.

In order to charge the container 11 with multiple parts 13 the parts are inserted successively along an insertion path (arrow 47), which is approximately in parallel to the holder means 17a-d, i.e., in parallel to the side surfaces 41 of the forth rails 33.

Figure 4:
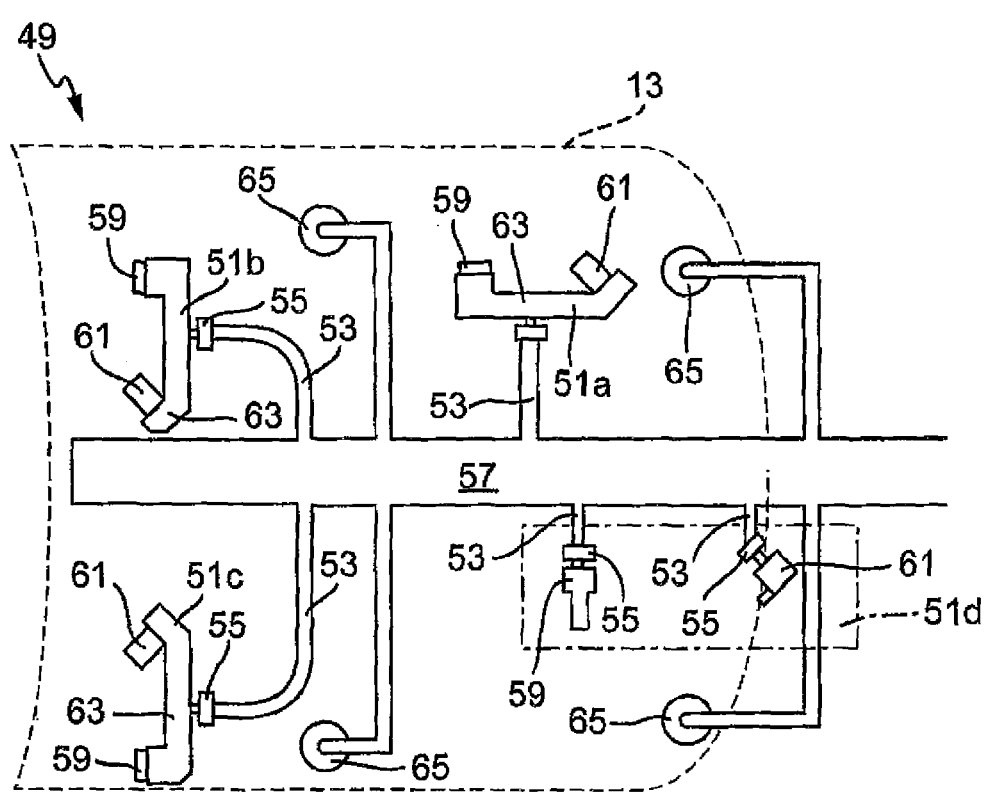
FIG. 4 shows a sectional side few of an insertion tool according to a preferred embodiment of the present invention.

FIG. 4 shows an insertion tool 49 for automatically inserting one part 13 or multiple parts 13 into the storage sections 15 of the container 11. The insertion tool 49 comprises four optical sensors 51a-d. The sensors 51a-d are arranged stationary which respect to a body 57 of the insertion tool by means of appropriately formed mounting rods 53. The sensors 51a-d are attached to the mounting rods 53 by means of a hinge 55 for fine adjustment of the location of the sensors 51a-d with respect to the body 57 of the insertion tool 49.

Each sensor 51a-d comprises a transmission unit 59 such as a laser to light one or more regions of the bearing surface 37a-d. In addition each optical sensor 51a-d comprises a receiver unit 61 such as a video camera to capture an image of the regions of the bearing surfaces 37a-d lit by the transmission unit 59. Three optical sensors, namely the first optical sensor 51a, the second optical sensor 51b, and the third optical sensor 51c, comprise a carrier element 63 to ensure a precise location of the receiver unit 61 with respect to the transmission unit 59. The transmission unit 59 and the receiving unit 61 of the forth optical sensor 51d are mounted separately to the body 57. Optical sensors 51a-d suitable for application in connection with the present invention are described in more detail in the published patent application US 2004/0179206 A1.

Furthermore, the insertion tool 49 comprises four controllable suction cups 65 fixed by means of the mounting rods 53 to the body 57 of the insertion tool 49. The suction cups 65 can be connected via an electrometrically controllable valve to a vacuum air system. The insertion tool 49 can grip the part 13 by moving the suction cups 65 to a surface of the part 13 and activating the suction cups 65 by connecting them to the vacuum air system by means of the valve. The contour of the part 13 griped by the insertion tool 49 is shown in FIG. 4 by a dashed line.

The insertion tool 49 is flat, i.e., the maximum dimension of the insertion tool 49 in a direction that is orthogonal to the plane of FIG. 4 is in the order of a width w of a storage section 15. In general, the thickness of the insertion tool 49 can be in the range between half the width w of a storage section 15 up to approximately twice the width w of the storage section 15.

In order to automatically perform movements of the insertion tool 49, e.g., the movement along the insertion path 47 the body 57 is attached to an appropriate actuator means such as an arm of an industrial robot.

Figure 5:
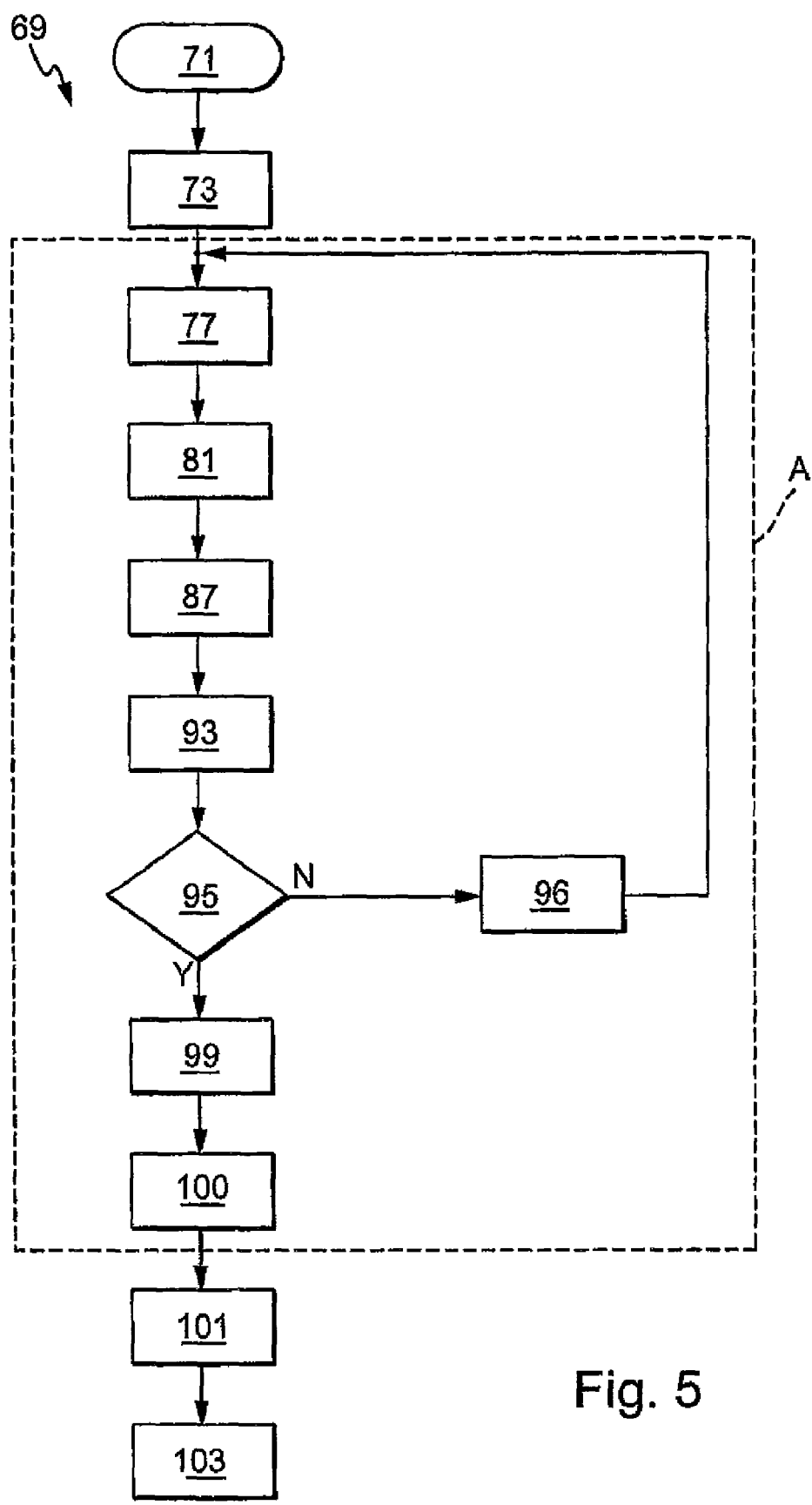
FIG. 5 shows a flow chart of a method according the preferred embodiment of the present invention.

In the following an exemplary method for automatically inserting one or multiple parts 13 into one or multiple storage sections 15 is described in more detail. As shown in FIG. 5, after a start 71 of the method, a location of the container 11 is determined in step 73. To this end, a predetermined portion of the container 11 such as an outer corner 75 of the container 11 (cf. FIG. 1) can be localized by means of a sensor. The sensor to be used to localize the outer corner 75 can be one of the sensors 51a-d or an additional sensor.

Then the insertion tool 47 is moved to a scanning position (step 77). The insertion tool 49 is in the scanning position if it is inserted into the container 11 between two adjacent storage sections 15 such that the first sensor 51a is located next to the first bearing surface 37a, the second sensor 51b is located next to the second bearing surface 37b, the third sensor 51c is located next to the third bearing surface 37c, and the forth sensor 51d is located next to the forth bearing surface 37d.

After the insertion tool 49 has been moved to the scanning position regions 79a-d of the bearing surfaces 37a-d are scanned by the sensors 51a-d in a step 81. In particular, the transmitter unit 59 of the first sensor 51a lights a first linear region 79a of the first bearing surface 37a. The transmitter unit 59 of the second sensor 51b lights a second linear region 79b of the second bearing surface 37b. The transmitter unit 59 of the third sensor 51c lights a third linear region 49c of the third bearing surface 37c. In contrast to the other sensors 51a-c lighting a single region 79a-c only, the transmitter unit 59 of the forth sensor 51d lights multiple linear forth regions 79d of the forth bearing surface 37d. The first region 79a, the second region 79b and the third region 79c are essentially in parallel to the first rail 21, the second rail 27, and the third rail 29 respectively. The linear forth regions 79d are orthogonal to the side surfaces 41 of the forth rails 33 and extend partly on the upper side the base plate 35 and partly on the forth rails 33.

During the scanning 81 the receiving units 61, i.e., the cameras, capture images of the regions 79a-d lit by the transmitter units 59. An exemplary image 83 of the first region 79a in depicted FIG. 6. The image 83 shows a line 85 the shape of which characterizes the shape of the first region 79a.

After the scanning 81 an analyzing step 87 is performed. The analyzing step 87 comprises calculating characteristic points 89 of the line 85 that characterize the shape of the first region 79a.

Figure 6:
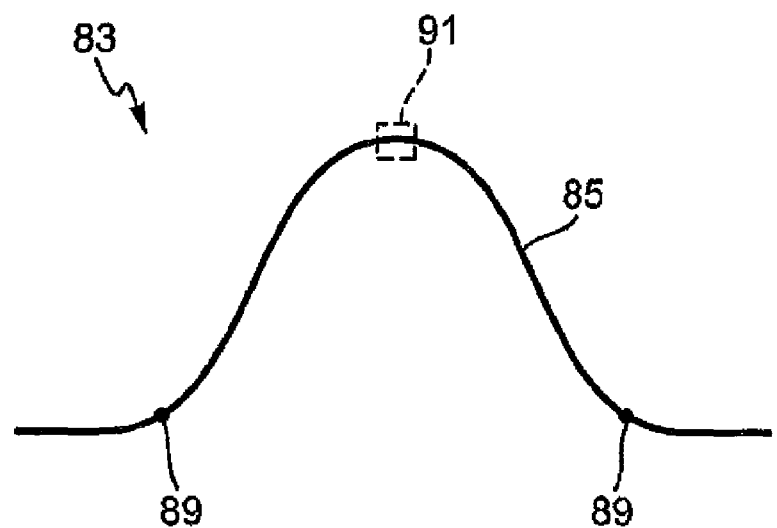
FIG. 6 shows a camera image generated by an optical sensor of the insertion tool shown in FIG. 4.

The characteristic points 89 are located near to the boundaries of the storage section. In another embodiment they are located exactly on the boundaries of the storage section 15. As shown in FIG. 6, an additional characterizing point 91 can be calculated. In an embodiment of the present invention this point can be located in the middle of the storage section 15, as shown in FIG. 6.

In a following step 93 a position of the holder means 17a-d is determined based on the scanning 81 and/or the analysing 87. Then in a step 95 it is verified by means of the sensors 51a-d, the scanning 81, and/or the analysing 87 whether the holder means 15 are available for insertion of the part 13. To this end the verifying 95 may comprise checking whether the storage section is occupied by an already inserted part 13, whether the storage section 15 is blocked by an foreign body 97 (see FIG. 2), and/or whether the holder means are damaged, e.g., deformed. If the storage section is not available (N) then a different storage section 15 is selected in a step 96. After step 96 has been completed the method jumps back to step 77.

If the storage section 15 is available (Y) then a step 99 is executed. In step 99, the orientation of the holder means 17a-d and therefore the orientation of the storage section 15, is determined in a step 99.

After step 99 has been completed a step 100 is performed to determine an optimal insertion path 47 to quickly insert the part 13 into the storage section 15 without collisions. Both the position as well as the orientation of the holder means 17a-d is used to determine the insertion path 47 along which the part 13 is to be inserted into the storage section.

As shown in FIG. 5, the method 69 comprises an image acquisition and processing section A, which comprises the steps 77, 81, 87, 93, 95, 96, 99, and 100.

Finally, the part 13 can be griped by means of the suction cups 65 of the insertion tool 49 (step 101) and be inserted into the storage section 15 by moving the part 13 into the storage section 15 along the determined insertion path 47 (step 103).

Figure 7:
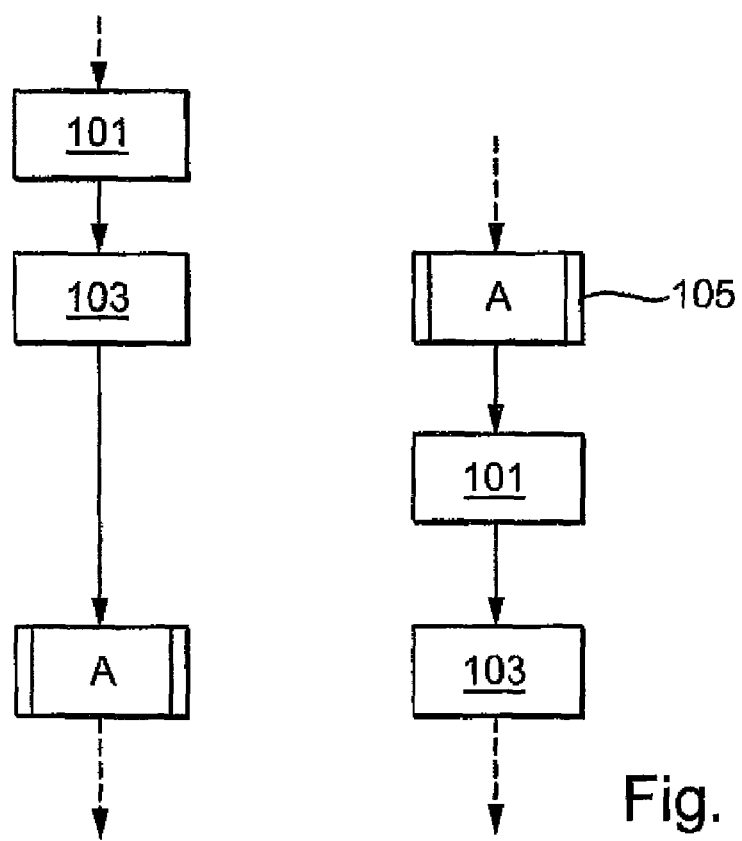
FIG. 7 shows a flow chart of simultaneously executed tasks of the method shown in FIG. 5.

The insertion tool 49 can insert a part 13 into one storage section 15 and perform image acquisition and processing steps (A) simultaneously. That is the step 103 of inserting and the image acquisition and the processing section A can be executed at the same time as shown in FIG. 7. The step 103 depicted on the left hand side of FIG. 7 inserts the part 13 into the rightmost storage section 15 of the container 11 (cf. FIG. 1 and FIG. 2). While inserting the part 13 into the rightmost storage section 15 the image acquisition and processing section A (cf. function 105 at the right hand side of FIG. 7) calculates the position and the orientation of the storage section 15 next to the rightmost storage section 15 so that a second part can be griped and inserted into the next storage section 15 (cf. steps 101 and 103 at the right hand side of FIG. 7) without the need of an additional movement of the insertion tool 49 for the execution of the image acquisition and processing steps (A). The steps 105, 101, and 103 can be repeated as often as needed in order to insert the needed number of parts 13 into the container 11. After the container 11 has been completely filled with parts 13 or if a predetermined number of parts 13 has been inserted into the container 11 then the method is completed. A different container can be provided and the method can be started again.

Figure 8:
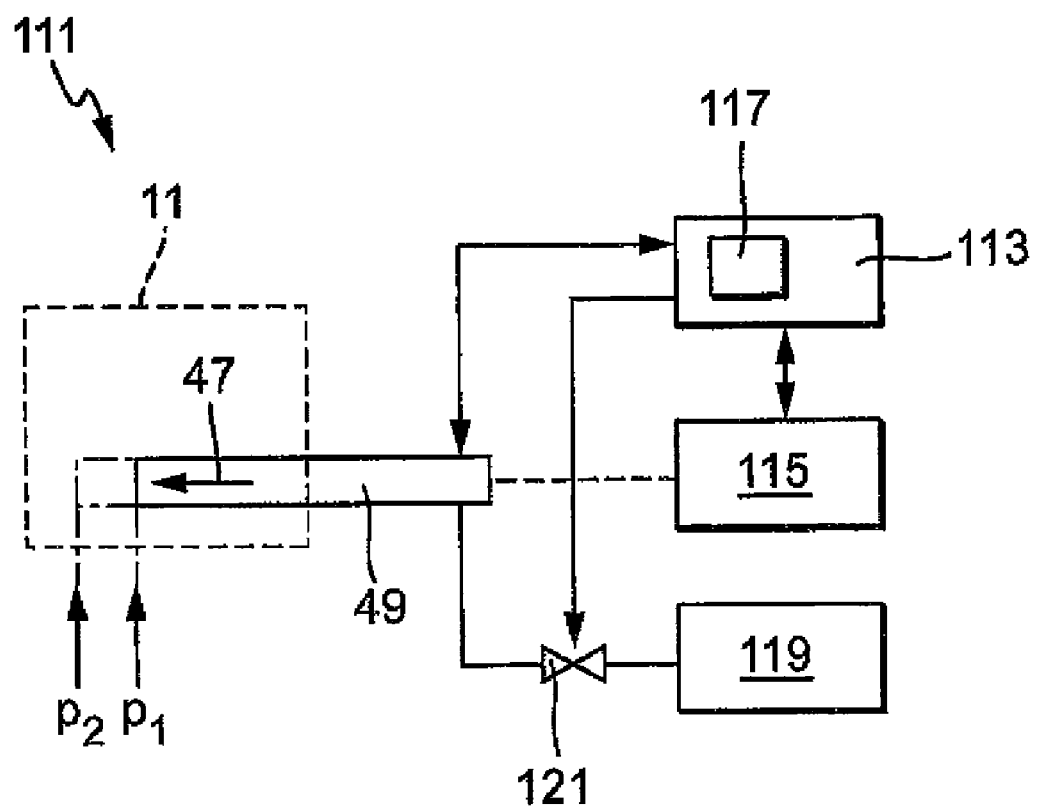
FIG. 8 shows a schematic view of an insertion tool arrangement according to the preferred embodiment.

As schematically depicted in FIG. 8, the insertion tool 49 is part of an insertion tool arrangement 111. The insertion tool arrangement 111 comprises control means 113 and actuator means 115 for moving the insertion tool 49. For the sake of completeness the vacuum air system 119 and the electromagnetically controllable valve 121 are also depicted in FIG. 6. Both the insertion tool 49 as well as the actuator means 115 is controlled by the control means 113. A digital computer 117 of the control means 113 is programmed to execute the method 69. In the embodiment shown in FIG. 6, the insertion tool 49 is initially moved to a first scanning position $p_1$ and then to a second scanning position $p_2$, wherein the second scanning position $p_2$ corresponds to an end position where the control means 113 close the valve 121 in order to disconnect the suction cups 65 from the vacuum air system 119 and to release the part 13.

The invention claimed is:

1. Method for automatically inserting at least one part of a given shape into a storage section of a container, wherein the storage section comprises a plurality of holder means adapted for holding one of the at least one part, wherein the part is inserted by means of an insertion tool, and wherein the method comprises the steps of:
   detecting the position of the holder means by means of at least one optical sensor,
   wherein the method further comprises the steps of:
   verifying by means of the at least one optical sensor whether the holder means of a certain storage section are available for insertion of the part;
   detecting the orientation of the holder means of an available storage section by means of the at least one optical sensor;
   determining an insertion path along which the part is inserted into the available storage section by means of the insertion tool, the insertion path depending on the shape of the part, the detected position and the orientation of the holder means; and
   inserting the part into the available storage section along the determined insertion path.

2. Method according to claim 1, wherein the holder means comprises at least one bearing surface adapted to face the inserted part, and wherein the method comprises scanning at least one region of at least one bearing surface by means of the at least one optical sensor, wherein said detecting the position, said verifying, and/or said detecting the orientation is based on said scanning.

3. Method according to claim 2, wherein, the verifying whether the holder means are available comprises checking whether the storage section is occupied by an already inserted part, whether the storage section is blocked by a foreign body, and/or whether the holder means are damaged.

4. Method according to claim 2, wherein the container comprises multiple storage sections arranged side by side and wherein the inserting of the part and the scanning are performed simultaneously, wherein the storage section into which the part is inserted and the storage section the region of the bearing surface of which is scanned differ from each other and are preferably directly adjacent.

5. Method according to claim 1, wherein, the verifying whether the holder means are available comprises checking whether the storage section is occupied by an already inserted part, whether the storage section is blocked by a foreign body, and/or whether the holder means are damaged.

6. Method according to claim 1, wherein the scanning comprises computing at least one characteristic point, wherein the characteristic point characterizes a shape of the scanned region of the bearing surface.

7. Method according to claim 1, wherein the insertion tool comprises multiple optical sensors and in that multiple regions of different bearing surfaces are scanned, wherein the regions of different bearing surfaces are scanned by different sensors.

8. Method according to claim 1, wherein multiple regions of a single bearing surface are scanned by a single sensor.

9. Method according to claim 1 wherein at least one sensor is arranged stationary with respect to the insertion tool and in that the scanning comprises moving the insertion tool to at least one scanning position ($p_1$, $p_2$) such that the sensor is located next to the region of the bearing surface to be scanned.

10. Method according to claim 9, wherein the scanning comprises moving the insertion tool successively to multiple different scanning positions ($p_1$, $p_2$).

11. Method according to claim 10, wherein the method comprises a step of determining the location of the container by locating a predetermined portion of the container, preferably an outer corner of the container.

12. Method according to claim 1, wherein the method comprises a step of determining the location of the container by locating a predetermined portion of the container, preferably an outer corner of the container.

13. Insertion tool arrangement for automatically inserting at least one part of a given shape into a storage section of a storage container, wherein the storage section comprises a plurality of holder means adapted for holding one of the at least one part, the insertion tool arrangement comprises an insertion tool for inserting the part and wherein the insertion tool arrangement comprises at least one optical sensor for detecting the position of the holder means, and wherein the insertion tool arrangement comprises control means configured to perform a method comprising the steps of:
 verifying by means of the at least one optical sensor whether the holder means of a certain storage section are available for insertion of the part;
 detecting the orientation of the holder means of an available storage section by means of the at least one optical sensor;
 determining an insertion path along which the part is inserted into the available storage section by means of the insertion tool, the insertion path depending on the shape of the part, the detected position and the orientation of the holder means; and
 inserting the part into the available storage section along the determined insertion path.

14. Insertion tool arrangement according to claim 13, wherein the insertion tool arrangement comprises at least one optical sensor to scan the region of the bearing surface, wherein the sensor comprises a laser to light the region and a camera for acquisition of an image of the region.

15. Insertion tool arrangement according to claim 14, wherein the part is essentially flat and the storage section corresponds to an essentially flat portion of the container bounded by at least one slot of the holder means located at an edge of the storage section and forming the bearing surface, and in that the insertion tool is movable to at least one scanning position ($p_1$, $p_2$) such that the optical sensor is located next to the slot in order to scan at least one region of the bearing surface.

16. Insertion tool arrangement according to claim 15, wherein the holder means comprise multiple slots and the insertion tool comprises multiple sensors, wherein each sensor is arranged stationary with respect to the insertion tool such that each sensor is located next to a different slot if the insertion tool is located at the scanning position ($p_1$, $p_2$).

\* \* \* \* \*